(12) United States Patent  (10) Patent No.: US 7,980,950 B2
Osumi et al.  (45) Date of Patent: Jul. 19, 2011

(54) GAME MACHINE AND METHOD WITH CHANGING GAME FIELD

(75) Inventors: Sakae Osumi, Tokyo (JP); Akinori Nishiyama, Tokyo (JP); Shinichi Manabe, Osaka (JP)

(73) Assignee: Sega Corporation, Tokyo (JP)

( * ) Notice: Subject to any disclaimer, the term of this patent is extended or adjusted under 35 U.S.C. 154(b) by 46 days.

(21) Appl. No.: 12/005,712

(22) Filed: Dec. 28, 2007

(65) Prior Publication Data

US 2009/0170599 A1 Jul. 2, 2009

(51) Int. Cl.
*A63F 13/00* (2006.01)
(52) U.S. Cl. ............... 463/31; 463/30; 463/32; 463/33
(58) Field of Classification Search ............... 463/1, 6, 463/30–33, 40–42
See application file for complete search history.

(56) References Cited

U.S. PATENT DOCUMENTS

2005/0176502 A1* 8/2005 Nishimura et al. ............ 463/31
2007/0198178 A1* 8/2007 Trimby et al. ................ 701/209

FOREIGN PATENT DOCUMENTS

JP 2006-130123 5/2006

* cited by examiner

*Primary Examiner* — Ronald Laneau
*Assistant Examiner* — Ross A. Williams
(74) *Attorney, Agent, or Firm* — Jordan and Hamburg LLP

(57) ABSTRACT

A game control program includes a coordinates receiving step for receiving coordinates in a virtual apace, coordinates being input by a player, a course generating step for generating a course according to the coordinates input by the player, along which course a character moves in the virtual space, a course segment setting step for dividing said course into a plurality of segments, a geographical feature setting step for setting geographical features of each of the segments according to geographical position of each of the segments in the virtual space, an event setting step for setting events occurring on each of the segments according to a predetermined random factor, and a character moving step for moving the character in a direction substantially along the segment. A game control machine includes corresponding means.

15 Claims, 13 Drawing Sheets

Fig. 6

| Geographical Position | | Geographical Feature |
|---|---|---|
| X | Y | |
| X0 - X1 | Y0 - Y1 | GF(1,1) |
|  | Y1 - Y2 | GF(1,2) |
| ............ | ............ | ............ |
|  | Yr-1 - Yr | GF(1,r) |
| X1 - X2 | Y0 - Y1 | GF(2,1) |
|  | Y1 - Y2 | GF(2,2) |
|  | ............ | ............ |
|  | Yr-1 - Yr | GF(2,r) |
| ............ | ............ | ............ |
| Xs-1 - Xs | Y0 - Y1 | GF(s,1) |
|  | Y1 - Y2 | GF(s,2) |
|  | ...... | ............ |
|  | Yr-1 - Yr | GF(s,r) |

Fig. 7

| Event Order | Events |
|---|---|
| 1 | EV(1,1), EV(1,2), EV(1,3), ......., EV(1,t) |
| 2 | EV(2,1), EV(2,2), EV(2,3), ......., EV(2,t) |
| ............ | ............................................. |
| n | EV(n,1), EV(n,2), EV(n,3), ......., EV(n,t) |

EV (i,j) is selcected from EV(i,1), EV(i,2), EV(i,3), ......., EV(i,t) according to a random number.

GAME MACHINE AND METHOD WITH CHANGING GAME FIELD

BACKGROUND OF THE INVENTION

1. Field of the Invention

The present invention relates to a game control program and a game machine. Particularly, the present invention relates to a game control program for executing a game in which a character travels on a stage selected by a player.

2. Prior Art

Usually, a plurality of stages are prepared in a conventional game and one or more of them are selected according to a predetermined rule in response to player's operation. It means that the same game field occurs in response to the same operation of the player and the player will have a dull feeling.

In published Japanese patent document 2006-130123, a soccer game program is disclosed for calculating and set a movement schedule route of characters when a player input the target point etc. in a virtual space. Various momentum changes will occur.

SUMMARY OF THE INVENTION

However, there are no games having changeable game field during rather long travel or movement of characters.

The present invention is invented to solve the conventional problems and has an object to change game field in response to player's operation as well as to random factors.

A game control program according to the present invention comprises, a coordinates receiving step for receiving coordinates in a virtual space, said coordinates being input by a player, a course generating step for generating a course according to said coordinates input by said player, along said course a character moves in said virtual space, a course segment setting step for dividing said course into a plurality of segments, a geographical feature setting step for setting geographical features of each said segment according to geographical position of each said segment in said virtual space, an event setting step for setting events occurring on each said segment according to a predetermined random factor, and a character moving step for moving said character in a direction substantially along said segment.

Therefore, a game field is changed in response to player's operation as well as to random factors.

A game control program according to the present invention may comprise, a geometrical angle calculation step for calculating a geometrical angle of each said segment in said virtual space, a geometrical angle difference calculation step for calculating an geometrical angle difference between said geometrical angle of successive said segments, and a turning angle setting step for setting a turning angle, said character being turned by said turning angle at a juncture between successive said segments, comprising, a maximal angle judgment step for judging whether said geometrical angle difference is more than a predetermined maximal angle or not, and a turning angle limiting step for limiting said turning angle to be said maximal angle when said when said geometrical angle difference is more than sad predetermined maximal angle.

Therefore, excessively sharp turning does not occur.

In a game control program according the present invention, said turning angle setting step may further comprises, a compensating angle calculation step for calculating a compensating angle by subtracting said maximal angle from said geometrical angle difference, a compensating angle addition step for adding a plurality of said compensating angles of said junctures when said geometrical angle differences are more than said maximal angle at said junctures, and a compensating angle decrement step for decreasing said compensating angle or said added compensating angle by a angular difference between said maximal and said geometrical angle difference from said, at most said compensating angle or said added compensating angle.

Therefore, the total turning angle of the character is adjusted so that deviation of the total turning angle from the total geometrical angle differences is minimized.

A game machine according to the present invention comprises, a coordinate input means for inputting coordinates in a virtual space in response to a player's operation, a coordinates receiving means for receiving said coordinates in said virtual apace, a course generating means for generating a course according to said coordinates, along said course a character moves in said virtual space, a course segment setting means for dividing said course into a plurality of segments, a geographical feature setting means for setting geographical features of each said segment according to geographical position of each said segment in said virtual space, an event setting means for setting events occurring on each said segment according to a predetermined random factor, and a character moving means for moving said character in a direction substantially along said segments.

Therefore, a game field is changed in response to player's operation as well as to random factors.

A game machine according to the present invention may further comprises, a geometrical angle calculation means for calculating a geometrical angle of each said segment in said virtual space, a geometrical angle difference calculation means for calculating an geometrical angle difference between said geometrical angle of successive said segments, and a turning angle setting means for setting a turning angle, said character being turned by said turning angle at a juncture between successive said segments, comprising, a maximal angle judgment means for judging whether said geometrical angle difference is more than a predetermined maximal angle or not, and a turning angle limiting means for limiting said turning angle to be said maximal angle when said geometrical angle difference is more than sad predetermined maximal angle.

Therefore, excessively sharp turning does not occur.

In a game machine according the present invention, said turning angle setting means may further comprises, a compensating angle calculation means for calculating a compensating angle by subtracting said maximal angle from said geometrical angle difference, a compensating angle addition means for adding a plurality of said compensating angles of said junctures when said geometrical angle differences are more than said maximal angle at said junctures, and a compensating angle decrement means for decreasing said compensating angle or said added compensating angle by a angular difference between said maximal and said geometrical angle difference, at most by said compensating angle or said added compensating angle.

Therefore, the total turning angle of the character is adjusted so that deviation of the total turning angle from the total geometrical angle differences is minimized.

BRIEF DESCRIPTION OF DRAWINGS

FIG. 6 is a table of geographical features.

FIG. 7 is a table of events.

DETAILED DESCRIPTION OF THE PRESENT INVENTION

A preferred embodiment of the game control program and game machine according to the present invention is described with reference to drawings.

Preferred Embodiment of the Present Invention

[Game Machine]

Figure 1:
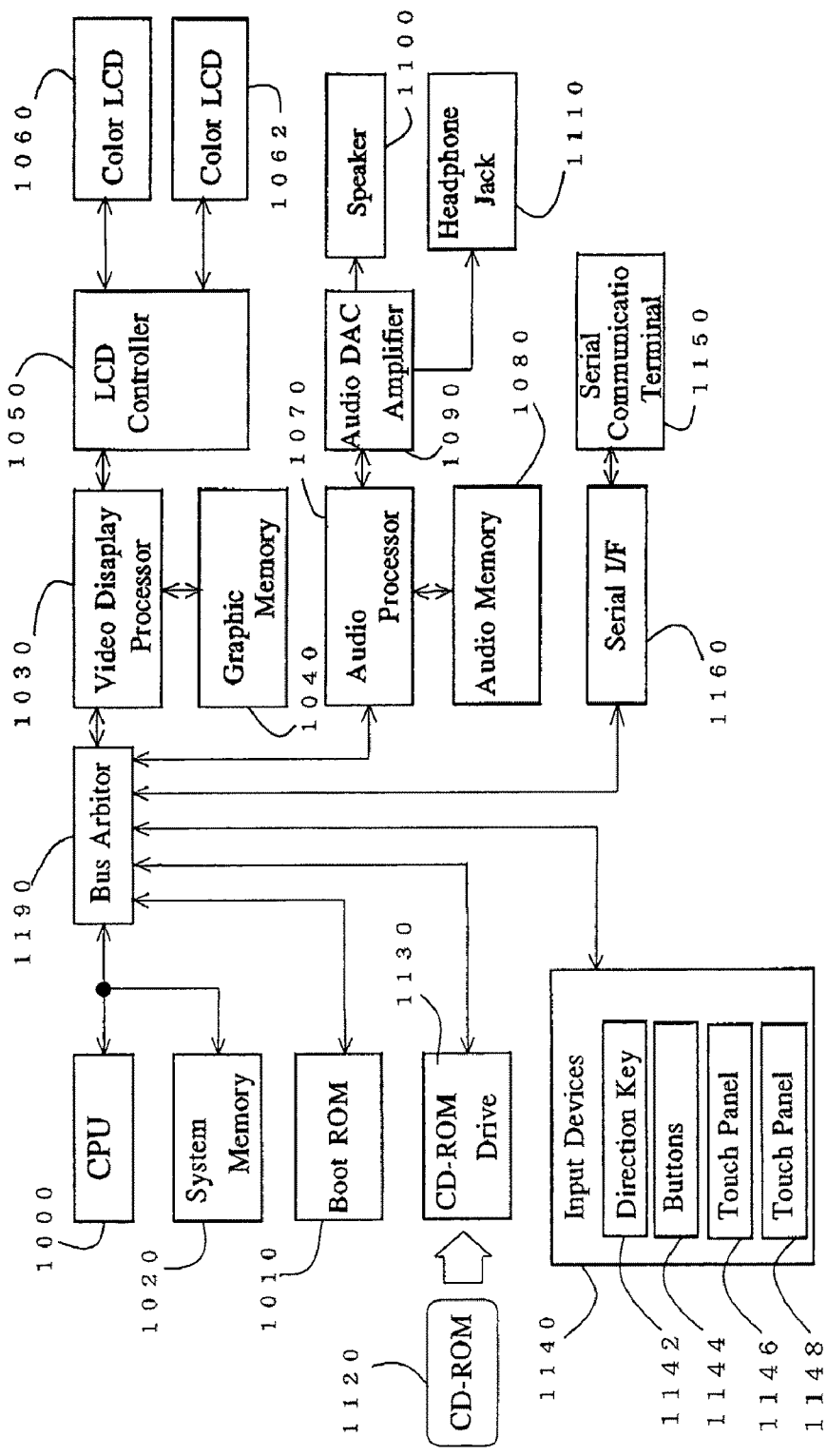
FIG. 1 is a block diagram showing an embodiment of a game machine according to the present invention.

In FIG. 1, a game machine has a CPU 1000 for controlling totally the game machine, a boot ROM 1010 for storing a program which starts the game machine up and a system memory 1020 for storing data and programs executed by the CPU 1000.

The game machine includes a video display processor 1030 for generating and controlling an image to be displayed and a graphic memory 1040 for storing a material image of images to be generated or generated images. The video display processor 1030 drives a LCD controller 1050 so as to display an image on a display portions 1060 and 1062, such as color LCDs (liquid crystal devices).

The game machine includes an audio processor 1070 for generating sound and an audio memory 1080 for storing audio data to be generated. The audio processor 1070 generates a digital sound signal according to the data stored in the audio memory 1080. The digital signal is converted by a audio DA amplifier 1090 into an analog signal as well as amplified to be an adequate level.

The analog signal from the audio DA amplifier 1090 is input to a speaker 1100, a headphone (not shown) connected to a headphone jack 1110 and so forth for outputting sound.

The game machine includes a CD-ROM drive 1130 to which a CD-ROM 1120 is connected as a memory medium. A game program and data are read from the CD-ROM 1120 by the drive 1130 into the system memory 1020, graphic memory 1040 and audio memory 1080.

The game machine includes an input device 1140 of direction key 1142, buttons 1144, touch panels 1146 and 1148 etc. A player operates various operation by the input device 1140 for executing a game. The display portions 1060 and 1062 are covered with the touch panels 1146 and 1148, respectively. Therefore, figures are directly drawn on the display portions 1060 and 1062 when a player moves a touch pen or other drawing tools on the touch panels 1146 and 1148.

The game machine includes a serial communication terminal 1150 for transmitting and receiving a game program and data with other machines for game or other purpose. A serial interface 1160 is provided for connecting the serial communication terminal 1150 with other components of the game machine.

Therefore, it is possible for the player to play with or against other players by the game machine through the serial communication terminal 1150.

The game machine includes a bus arbiter 1190 for a communication arbitration among CPU 1000 and other components.

Therefore, the program and data are properly read out and written into.

The memory medium is not limited to a CD-ROM 1120. A floppy disk drive etc. may be provided in the game machine for applying a floppy disk and other medium as a memory medium.

When the boot program is stored in the floppy disk etc., the boot ROM can be omitted.

The display portions 1060 and 1062 are not limited to the color LCDs, any display means such as CRT, plasma display, DLP-type projector etc. may be applied as the display portion.

The communication with another game machine is not limited to the serial communication, parallel communication can be applied. Either radio or wire communication can be applied.

The game machine is not limited to a game machine, a general purpose computer, a display portion of various communication apparatus, a display portion of handy electronic machine, various household electric appliance, controller unit for remote control of household electric appliance, a display portion of various office machine, various indoor or outdoor display systems, watch or other personal ornaments, a display portion of various security systems, display device for traffic sign or other public signs, and various display means.

When the game machine is a general purpose computer in which the control program according to the present invention is executed, a program is read by the general purpose computer, which is executable by the general purpose computer and includes program codes for executing each step of the control program.

A game program of the general purpose computer for displaying an image is loaded from a ROM within the general purpose computer, or from a memory medium readable by the general purpose computer or from a server through a network.

Figure 2:
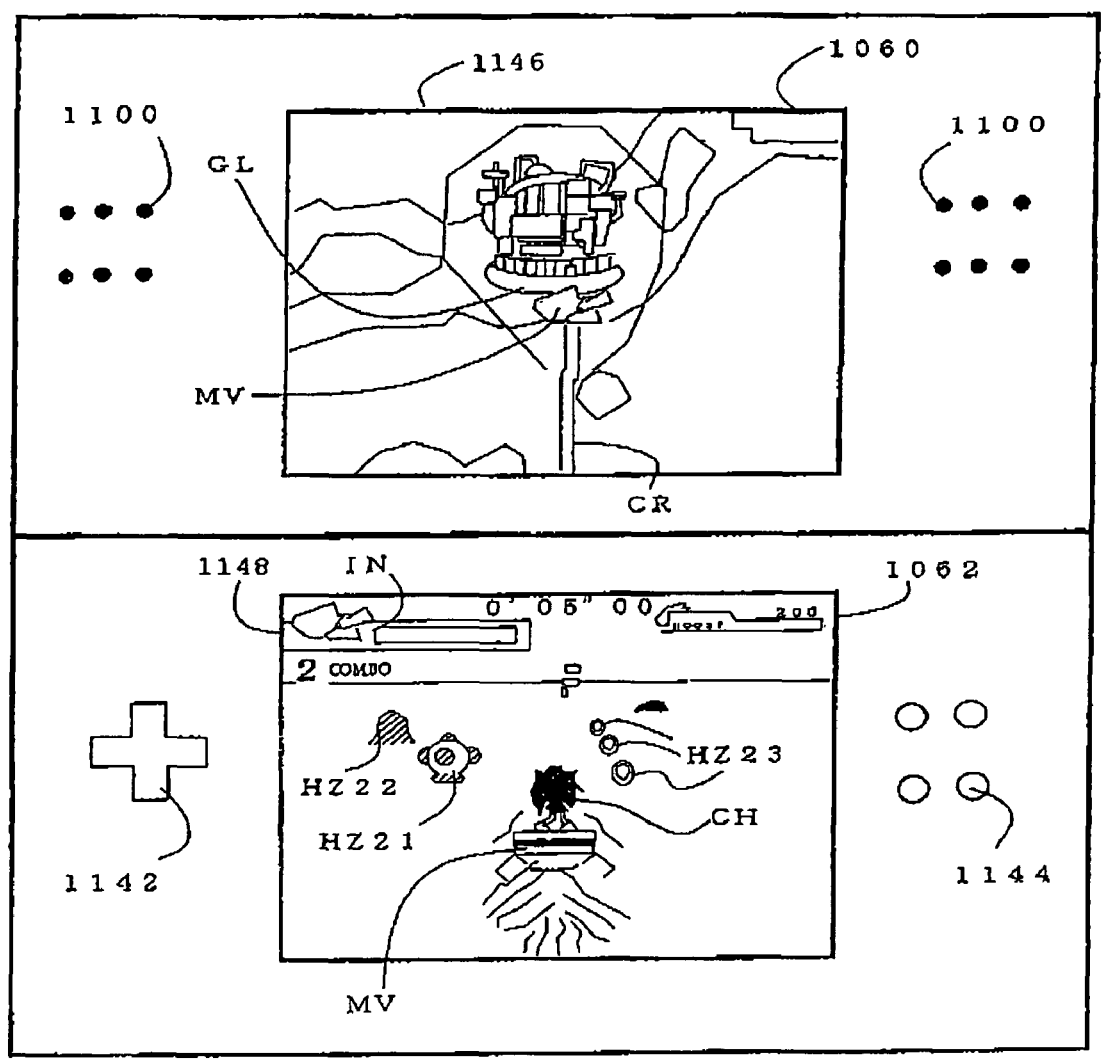
FIG. 2 is a game image displayed by the game machine in FIG. 1.

A control program shown in FIG. 2 is executed in the game machine in FIG. 1.

Figure 3:
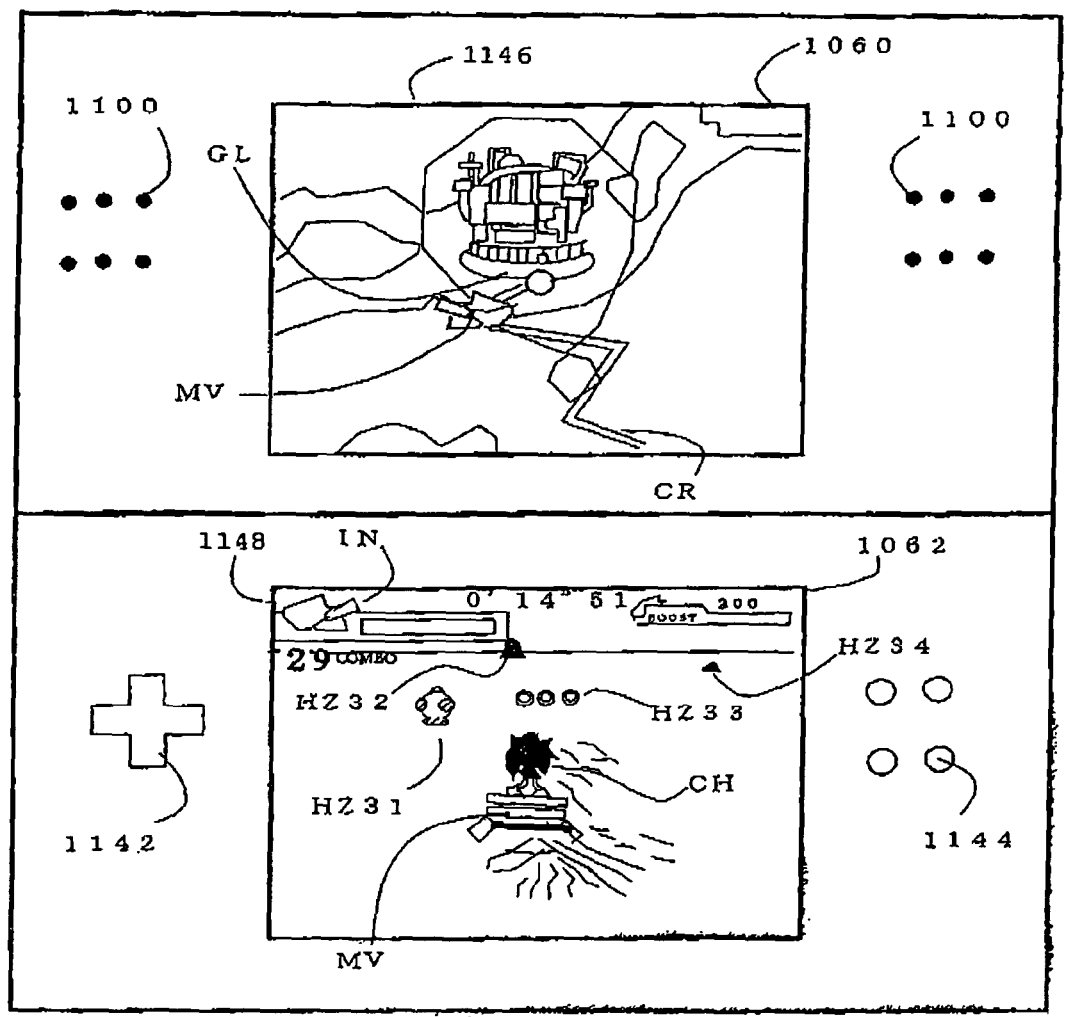
FIG. 3 is another game image displayed by the game machine in FIG. 1.

As shown in FIGS. 2 and 3, the game machine displays different game images on the display portions 1060 and 1062. For example, a map such as nautical chart showing a course along which a character CH moves is shown on the display portion 1060. On the display portion 1062, the character CH moving (sailing) in high speed is shown with reality.

Figure 4:
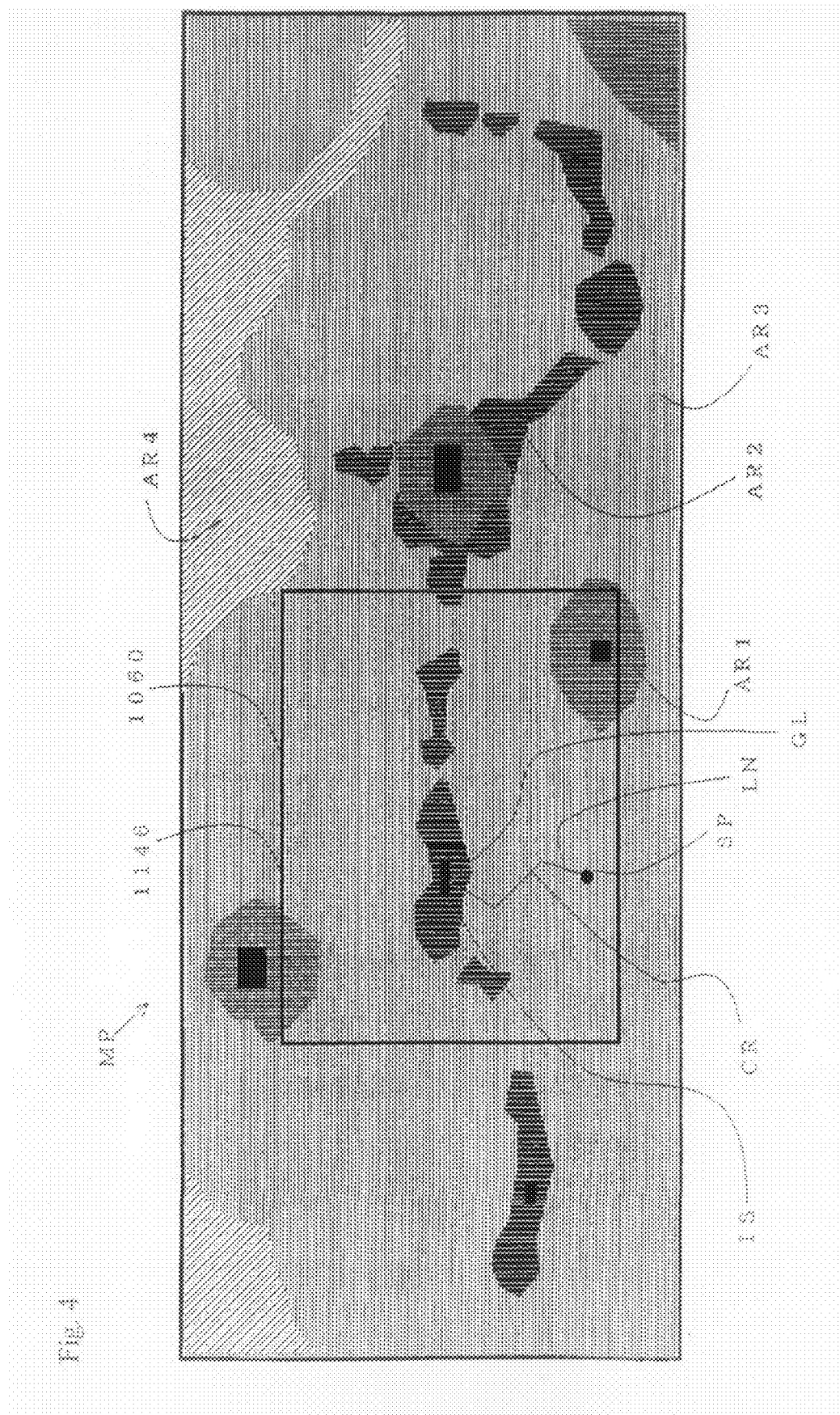
FIG. 4 is a nautical chart shown by the game machine in FIG. 1.

As shown in FIG. 4, the total nautical chart MP is shown, in which there are a plurality of islands IS indicated by black rectangle, areas AR1 indicated by dense cross hatching around the islands, areas AR2 indicated by dense vertical hatching around the islands or the areas AR2, areas AR3 indicated by horizontal hatching around the areas AR1 or AR2, and areas AR4 far from the islands IS.

The nautical chart MP is partially shown on the display 1060, and the player can draw a course CR in the nautical chart MP by the touch panel 1146. The course CR is defined by a start point SP, an end point as a goal GL and a line LN connecting the points SP and GL. The areas AR3 and AR4 remote from the islands are undeveloped and the condition of the areas is disclosed when the character CH sails in these areas. The course CR is input before the game is started.

On the display portion 1060 of FIG. 2, the Island IS of the goal GL is enlarged and shown in detail. A vehicle MV of the character CH, such as a personal water craft (PWC), called "jet ski" or "marine jet" in Japan, is shown on the course CR for indicating a position of the character CH on the course CR. The course in FIG. 2 is substantially a straight line.

On the display portion 1062 of FIG. 2, the character CH sailing the personal water craft MV on the sea is viewed from behind, and various obstacles HZ21, HZ22 and HZ23 exist on the sea. The player operates the input devices 1140 so as to control the personal water craft MV not to collide the obstacles HZ21, HZ22 and HZ23. The character CH sails straight forward according to the course CR. Further, in the display portion 1062, indicator IN is displayed for showing game time "0' 05" 00", remained distance "200" from the goal GL, sailed distance gage etc.

While, on the display portion 1060 of FIG. 3, a curved course CR is set by the player and the vehicle MV is just turning on the sharp curvature of the course CR. Other items are similar to those of FIG. 2.

On the display portion 1062 of FIG. 3, the character CH sails the vehicle MV with turning on the sea corresponding to the curvature of the course. However, the turning angle is not so steep as that of the curvature. The turning angle is limited under a predetermined maximum so that the player always feels comfortable sailing without excessive steep turning.

Figure 5:
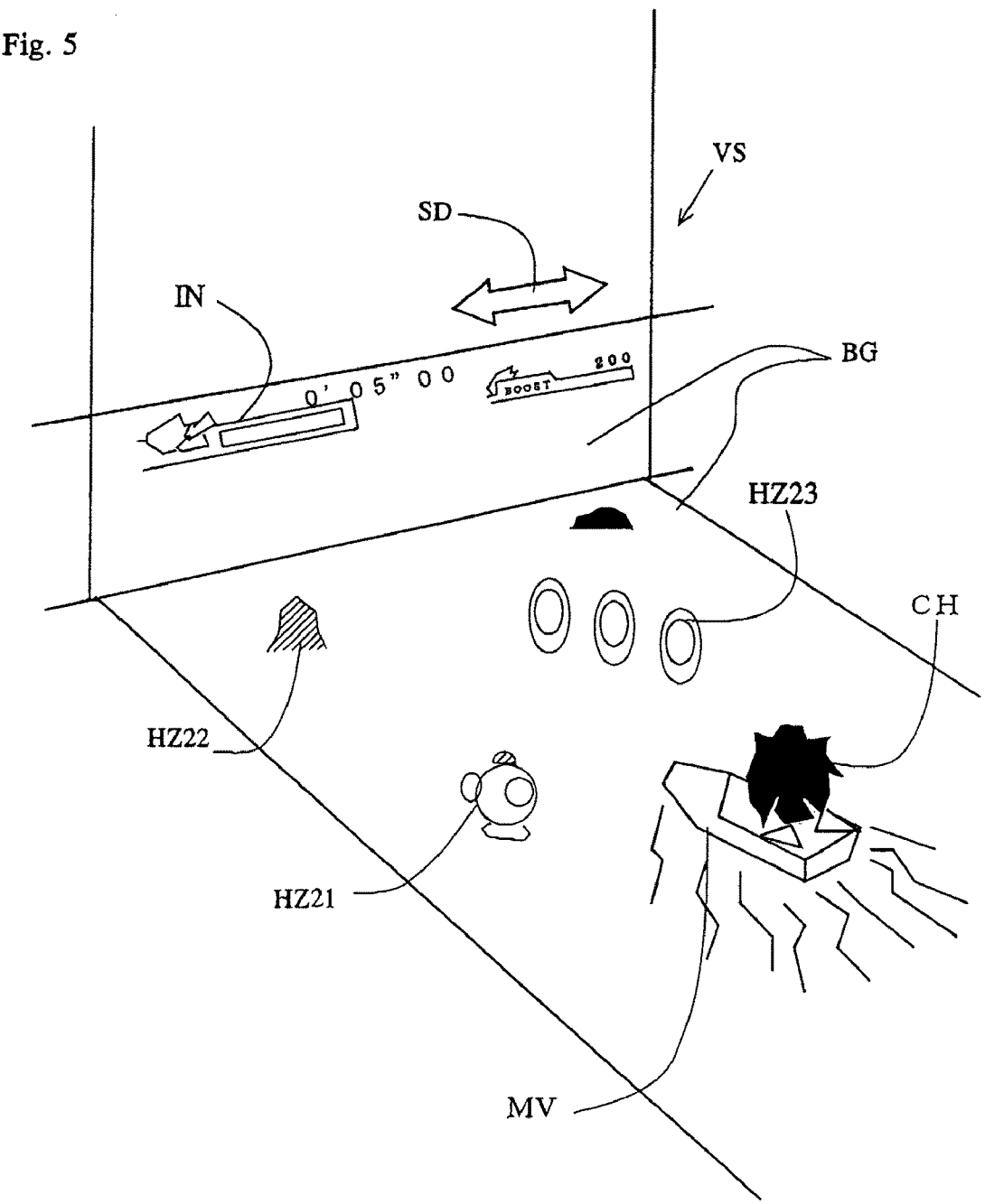
FIG. 5 is a perspective view of a virtual space of the game corresponding to the game image in FIG. 2.

As shown in FIG. 5, when the character turns by a steep angle during sailing, the background BG in the virtual space VS of the game is shifted horizontally (shown by an arrow SD) in extremely high speed. The player cannot follow the movement of the background. The course CR is divided into a plurality of segments S(1) to S(n) of a predetermined length, 4 pixels in Euclidian distance, for example. The turning angle is evaluated from a difference of geometrical angles of successive segments. The geometrical angle is an angle of a line connecting respective end points of each segment.

Here, the following parameters are defined.

Ag(i): The geometrical angle of ith segment S(i) against a reference line parallel to the horizontal line of the background BG.

Dg(i): The difference of geometrical angle between successive segments, Dg(i)=Ag(i+1)−Ag(i).

Amax: The predetermined maximal angle.

As(i): The sailing angle of the movement of the character CH on ith segment. The sailing angle As(i) is equal to Ag(i), Ag(i) plus a compensating angle AC (described later) or Amax.

Ac: Compensating angle. When Ag(i) is limited to As(i), Ac=Ag(i)−As(i), which is cancelled by adding totally or partially to Ag(i+1), Ag(i+2), . . . , Ag(n).

At(i): Turning angle. At(i)=As(i+1)−As(i).

Figure 8:
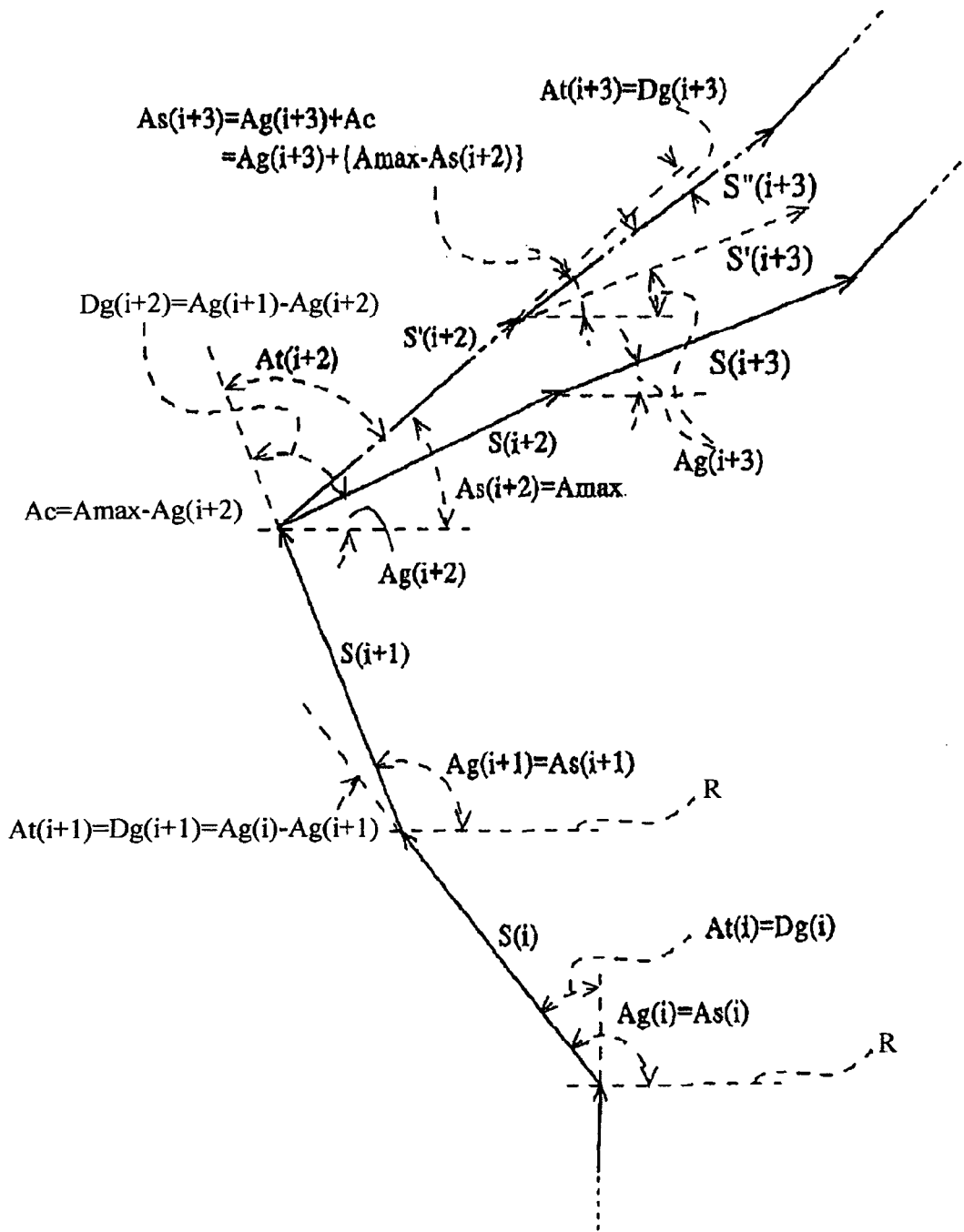
FIG. 8 is a figure showing the angles of segments.

In FIG. 8, the course CR includes segments S(i), S(i+1), S(i+2) and S(i+3) which are Ag(i), Ag(i+1), Ag(i+2), Ag(i+3) in the geometrical angle, respectively.

At the juncture of the segments S(i−1) and S(i), the turning angle At(i)=Dg(i) is smaller than Amax. Then, As(i)=Ag(i).

At the juncture of the segments S(i) and S(i+1), the turning angle At(i+1)=Dg(i+1)=Ag(i+1)−Ag(i) is smaller than Amax. Then, Ag(i+1)=As(i+1).

At the juncture of the segments S(i+1) and S(i+2), the turning angle At(i+2)=Dg(i+2)=Ag(i+2)−Ag(i+1) is larger than Amax. Then, As(i+2) is limited to Amax. And a compensating angle Ac=Amax−As(i+2) is generated. By the limitation of the angle As(i+2), the segment S(i+2) is changed to the segment S'(i+2) of smaller turning angle At(i+2).

At the end of the segment S(i+2), a segment S'(i+3) parallel to the segment S(i+3) is connected.

At the juncture of the segments S(i+2) and S'(i+3), the turning angle At(i+3)=Dg(i+2)=Ag(i+2)−Ag(i+1) is smaller than Amax. Further, as for the compensating angle Ac generated at the previous juncture, At(i+3)+Ac is smaller than Amax.

Then, At(i+3) is added by Ac for compensating the angle limitation at the previous juncture. And the segment S'(i+3) is changed to S"(i+3) which has the sailing angle As(i+3)=Ag(i+3)+Ac. The compensating angle Ac is cancelled.

On the display portion 1062 of FIG. 3, other obstacles HZ31 HZ32 and HZ33 than those of FIG. 2 exist in the sea.

Geographical features of the sea are predetermined for each position of the sea, and the geographical features of each position appears when the character CH passes the position. The geographical features are rocks (HZ22, HZ32 and HZ34, for example), ice, fog, seagulls etc.

As shown in FIG. 6, for example, geographical features GF(1,1), GF(1,2), . . . , GF(1,r), . . . , GF(s,r) are set in a areas of X-coordinate of X0 to X1 and Y-coordinate of Y0 to Y1, X-coordinate of X0 to X1 and Y-coordinate of Y1 to Y2, X-coordinate of X0 to X1 and Y-coordinate of Yr−1 to Yr, X-coordinate of Xs−1 to Xs and Y-coordinate of Yr−1 to Yr.

Various events are given to each position of the course CR according to a random factor. The obstacle HZ21 and HZ31 are bombs and HZ23 and HZ33 are rings for preventing the sailing of the vehicle MV as events. Other events such as treasure boxes, medicine boxes, enemies etc.

The events are determined according to random numbers and other random factors for each segment. For each of the 1st, 2nd, 3rd, . . . , nth segments, a plurality of events are prepared, and one of the events is selected by the random factor for each of the ith (1st to nth) segments.

As shown in FIG. 7, events EV(1,1), EV(1,2), . . . , EV(1,t) are prepared for the 1st event, events EV(2,1), EV(2,2), . . . , EV(2,t) are prepared for the 2nd event, . . . , events EV(n,1), EV(n,2), . . . , EV(n,t) are prepared for the nth event. For example, ith event(i,j) among EV(1,1), EV(1,2), . . . , EV(1,t) is selected as jth order event by the random number.

There are happy, safe, normal and dangerous events and the order of the events are determined according to a predetermined rule so that the player has some tension due to the dangerous events occurring at a proper probability.

For example, after the dangerous event, the normal event is positioned, otherwise, the dangerous event occurs according to the probability PE, and the probability (PE, hereafter) is determined according to continuous number (CNE, hereafter) of normal event. The more the CNE is, the higher PE is.

Since the course CR is freely set by the player and the events are randomly given, the game field is changed in response to player's operation as well as to random factors. Therefore, the game is kept refreshed and exciting. On the other hand, the geographical feature is determined for each geographical position of the nautical chart MP, so the natural geographical feeling is always given to the player.

In the game machine above, the CPU 1000, system memory 1020, and touch panels 1146 and 1148 cooperatively function as a coordinate input means for inputting coordinates in the virtual space VS in response to the player's operation.

The CPU 1000 and system memory 1020 cooperatively function as a coordinates receiving means for receiving the coordinates in the virtual space VS.

The CPU 1000 and system memory 1020 cooperatively function as a course generating means for generating the course CR according to the coordinates, along the course CR the character CH moves in the virtual space VS.

The CPU 1000 and system memory 1020 cooperatively function as a course segment setting means for dividing the course CR into the plurality of segments.

The CPU 1000 and system memory 1020 cooperatively function as a geographical feature setting means for setting the geographical features GF(i,j) of each segment according to geographical position of each segment in the virtual space VS.

The CPU 1000 and system memory 1020 cooperatively function as an event setting means for setting events EV(i,j) occurring on each segment according to the predetermined random factor.

The CPU 1000, system memory 1020, video display processor 1030 and graphic memory 1040 cooperatively function as a character moving means for moving the character CH in a direction substantially along the segments.

The CPU 1000 and system memory 1020 cooperatively function as a geometrical angle calculation means for calculating the geometrical angle Ag(i) of each segment S(i) in said virtual space VS.

The CPU 1000 and system memory 1020 cooperatively function as a geometrical angle difference calculation means for calculating the geometrical angle difference Dg(i) between the difference of the geometrical angle Ag(i) of successive segments S(i) and S(i+1).

The CPU 1000 and system memory 1020 cooperatively function as a turning angle setting means for setting the turning angle As(i+1)−As(i). The character CH turns by the turning angle at a juncture between successive segments S(i) and S(i+1).

The CPU 1000 and system memory 1020 cooperatively function as a maximal angle judgment means for judging whether the geometrical angle difference Dg(i) is more than the predetermined maximal angle Amax or not.

The CPU 1000 and system memory 1020 cooperatively function as a turning angle limiting means for limiting the turning angle At(i) to be the maximal angle Amax when the geometrical angle difference Dg(i) is more than Amax.

The CPU 1000 and system memory 1020 cooperatively function as a compensating angle calculation means for calculating the compensating angle Ac by subtracting the maximal angle Amax from the geometrical angle difference Dg(i).

The CPU 1000 and system memory 1020 cooperatively function as a compensating angle addition means for adding a plurality of the compensating angles Ac of said junctures when said geometrical angle differences Dg(i) are more than the maximal angle Amax at said junctures.

The CPU 1000 and system memory 1020 cooperatively function as a compensating angle decrement means for decreasing the compensating angle Ac or said added compensating angle Ac by an angular difference between said maximal and said geometrical angle difference, at most by said compensating angle or said added compensating angle.

[Game Control Program]

Next, the game control program executed by the game machine above for executing the processing above is described. However, the game control program may be executed by any other control apparatuses such as general purpose computers.

Figure 9:
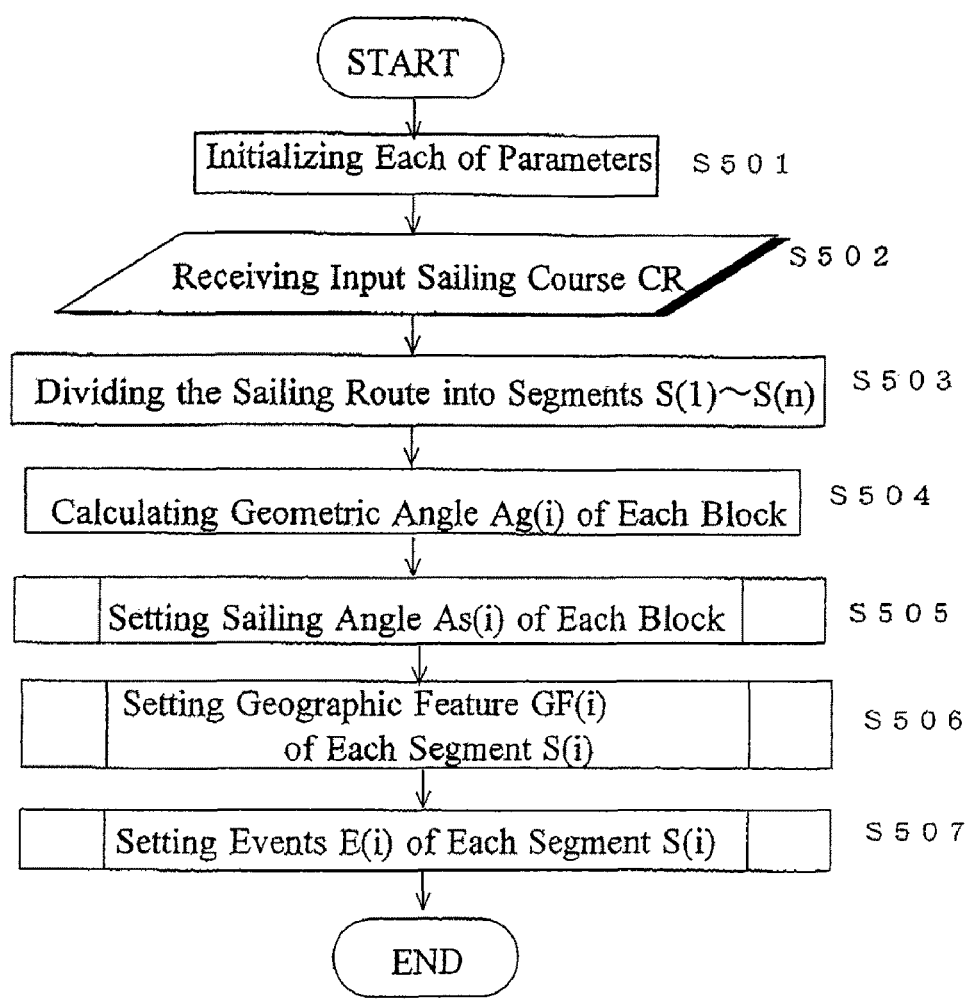
FIG. 9 is a flowchart of initial setting of an embodiment of a game control program according to the present invention.

FIG. 9 is a flowchart of initial setting of an embodiment of a game control program according to the present invention. The initial setting is executed by the following steps.

Step S501: First, parameters for the initial setting are initialized. Parameters are coordinates of sailing course, end points of the segments, geographical features, events etc.

Step S502 (coordinates receiving step & course generating step): Following to the step S501, the coordinates of the sailing course CR is received by the CPU 1000 when the player input the sailing course CR by the touch panel 1146. And the sailing course CR is generated on the display portion 60 and 1062, by means of the CPU 1000, system memory 1020, video display processor 1030 and graphic memory 1040.

Step S503 (course segment setting step): Following to the step S502, the sailing course CR is divided to a plurality of segments S(1) to S(n), by means of the CPU 1000 and system memory 1020.

Step S504 (geometrical angle calculation step): Following to the step S503, the geometric angle Ag(i) of each segment S(i) is calculated, by means of the CPU 1000 and system memory 1020.

Step S505 (turning angle setting step): Following to the step S504, the sailing angle As(i) of each segment S(i) is set with reviewing the angle limitation of the maximal angle Amax, by means of the CPU 1000 and system memory 1020.

Step S506 (geographical feature setting step): Following to the step S505, the geographical features GD(i) of each segment S(i) is set as shown in the table of FIG. 6, by means of the CPU 1000 and system memory 1020.

Step S507 (event setting step): Following to the step S506, the events EV(i) of each segment S(i) is set as shown in the table of FIG. 7, by means of the CPU 1000 and system memory 1020.

Figure 10:
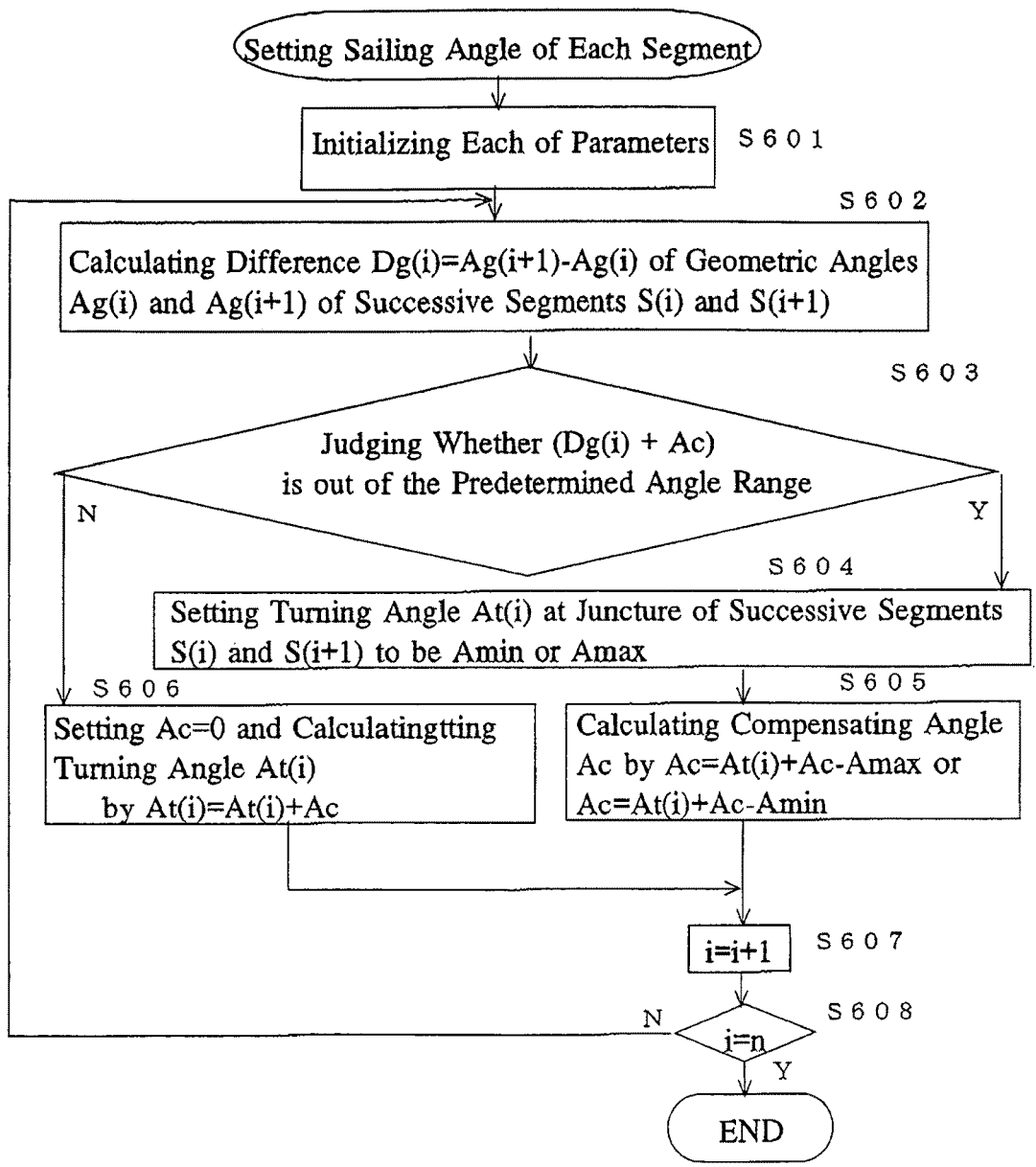
FIG. 10 is a flowchart of the step of setting sailing angle in FIG. 9.

FIG. 10 is a flowchart of the sailing angle setting step (Step S05) in FIG. 9. The sailing angle setting step is executed by the following steps.

Step S601: First, parameters for the sailing course setting are initialized. Parameters are the difference Dg(i) of geometrical angle between successive segments, predetermined maximal angle Amax, sailing angle As(i), compensating angle Ac, turning angle At(i) etc.

Step S602 (geometrical angle difference calculating step): Following to the step S601, geometrical angle difference is calculated. The difference Dg(i)=Ag(i+1)−Ag(i) for the successive segments S(i) and S(i+1).

Step S603 (maximal angle judgment step): It is judged whether the summation of the difference Dg(i) and the compensating angle Ac exceeds the maximal angel Amax or not. When the summation is more than Amax, the processing is advanced to the step 604, otherwise, the processing is advanced to the step 606.

Step S604 (turning angle limiting step): The turning angle At(i) is limited to Amax at the juncture of successive segment S(i) and S(i+1).

Step S605 (compensating angle calculation step & compensating angle decrement step): Following to the step S604, the compensating angle Ac is calculated by the formula $$Ac = A(t) + Ac - A\max.$$

Step S606 (compensating angle decrement step): The turning angle At(i) is set to be At(i)+AC and the compensating angle Ac is cancelled.

Figure 11:
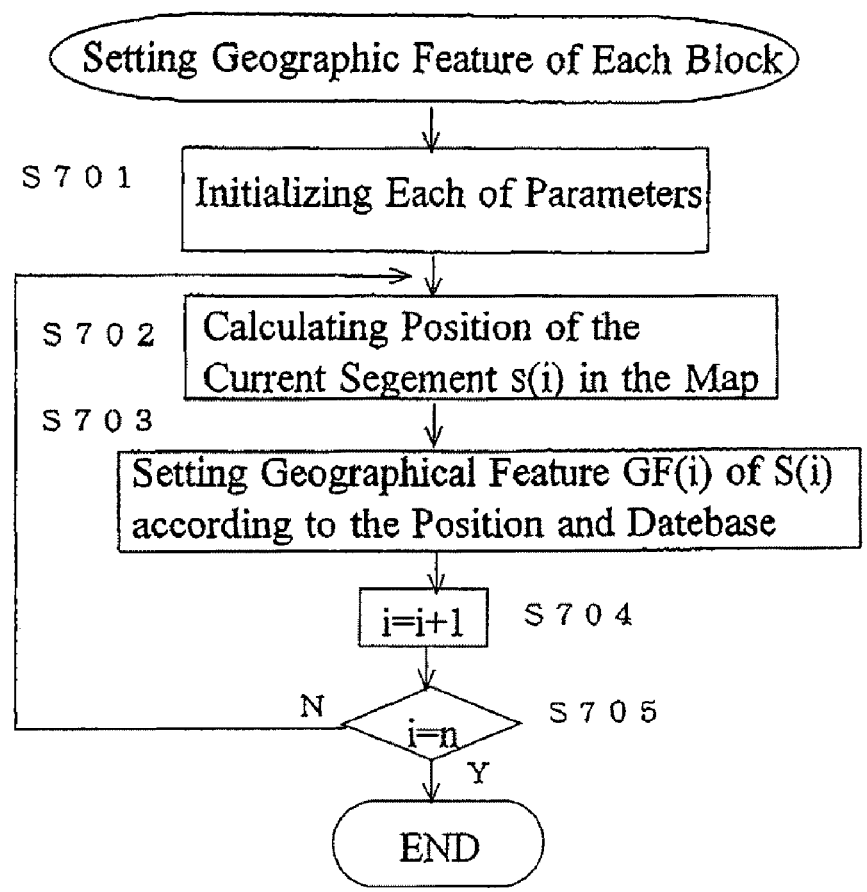
FIG. 11 is a flowchart of the step of setting geographic feature in FIG. 9.

FIG. 11 is a flowchart of the geographic feature setting step (S506) in FIG. 9.

Step S701: First, parameters for the geographic feature setting are initialized. Parameters are number of segments "i", number or other indicators of geographical features etc.

Step S702: Following to the step S701, the geographical position such as X and Y-coordinates of ith segment S(i) is calculated. The position is defined by a representative point such as the start point of the segment S(i).

Step S703: Following to the step S702, the geographical feature GF(i) is set for the segment S(i). The geographical features are stored in a database and searched according to the geographical position.

Step S704: Following to the step S703, the number "i" of the segment is increased by "1".

Step S705: Following to the step S704, it is judged whether the number "i" reaches the end "n" of the segment. When i=n or not, the processing is returned to the step S702, otherwise, the processing is terminated.

Figure 12:
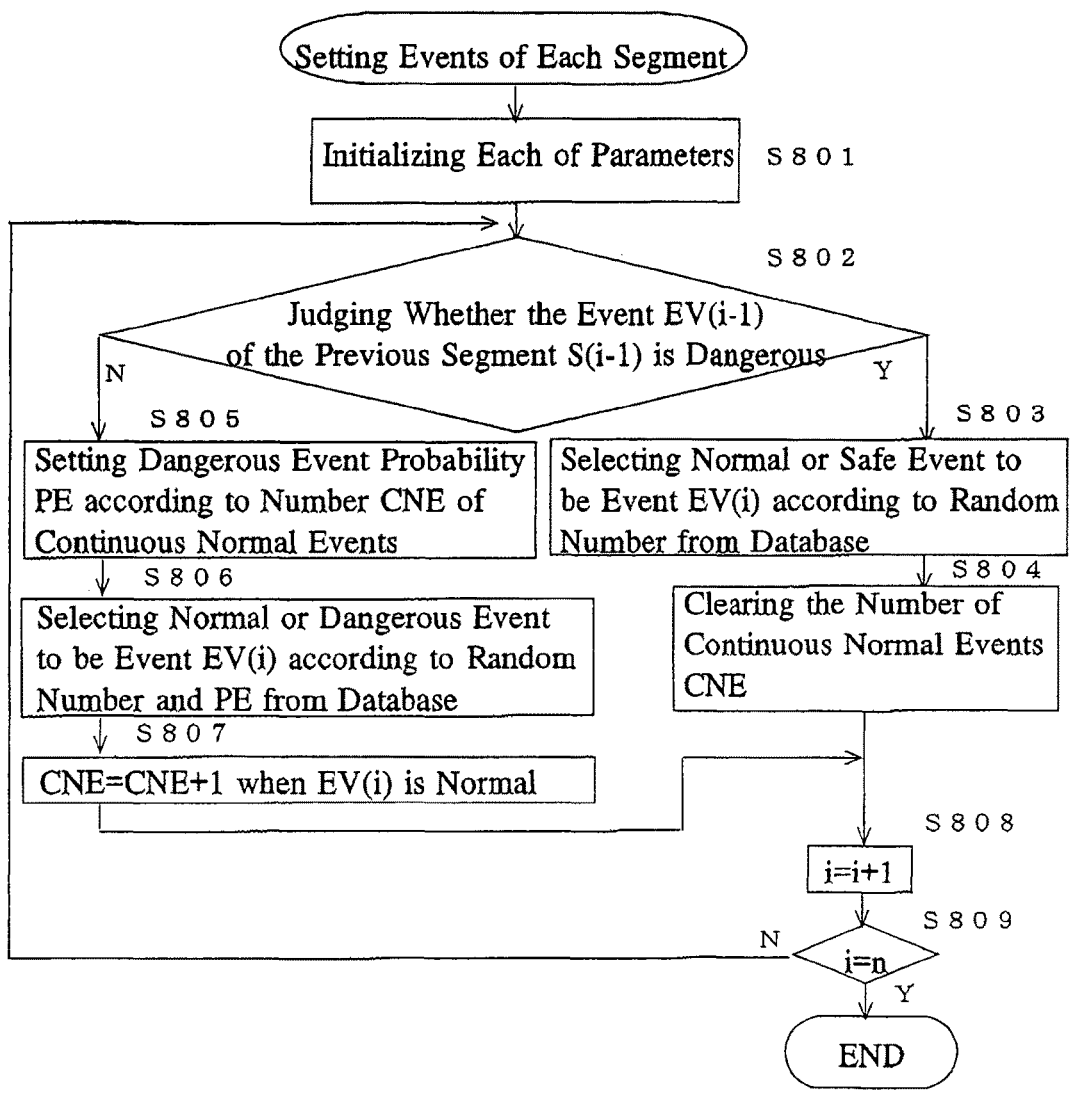
FIG. 12 is a flowchart of the step of setting events in FIG. 9.

FIG. 12 is a flowchart of the event setting step (S507) in FIG. 5.

Step S801: First, parameters for the event setting are initialized. Parameters are number of segments "i", number or other indicators of events, number of continuous normal events CNE, dangerous event probability PE etc.

Step S802: Following to the step S801, it is judged whether the event EV(i−1) of the previous segment S(i−1) is dangerous or not. When the event is dangerous, the step is advanced to the step S803, otherwise, to the step S805.

Step S803: The event EV(i) of the segment S(i) is set to be a normal or safe event according to the random number. The events are store in a database and selected by the random number.

Step S804: Following to the step S803, the number of continuous normal events CNE is cancelled.

Step S805: The dangerous event probability PE is set according to the number of continuous normal events CNE.

Step S806: Following to the step S805, an event is selected as the event EV(i) of the segment S(i) from the database according to the random number and the probability PE.

Step S807: Following to the step S806, the number of continuous normal events CNE is increased by "1".

Step S808: Following to the step S804 or S807, the number "i" of the segment is increased by "1".

Step S809: Following to the step S808, it is judged whether the number "i" reaches the end "n" of the segment or not. When i=n, the processing is returned to the step S802, otherwise, the processing is terminated.

Figure 13:
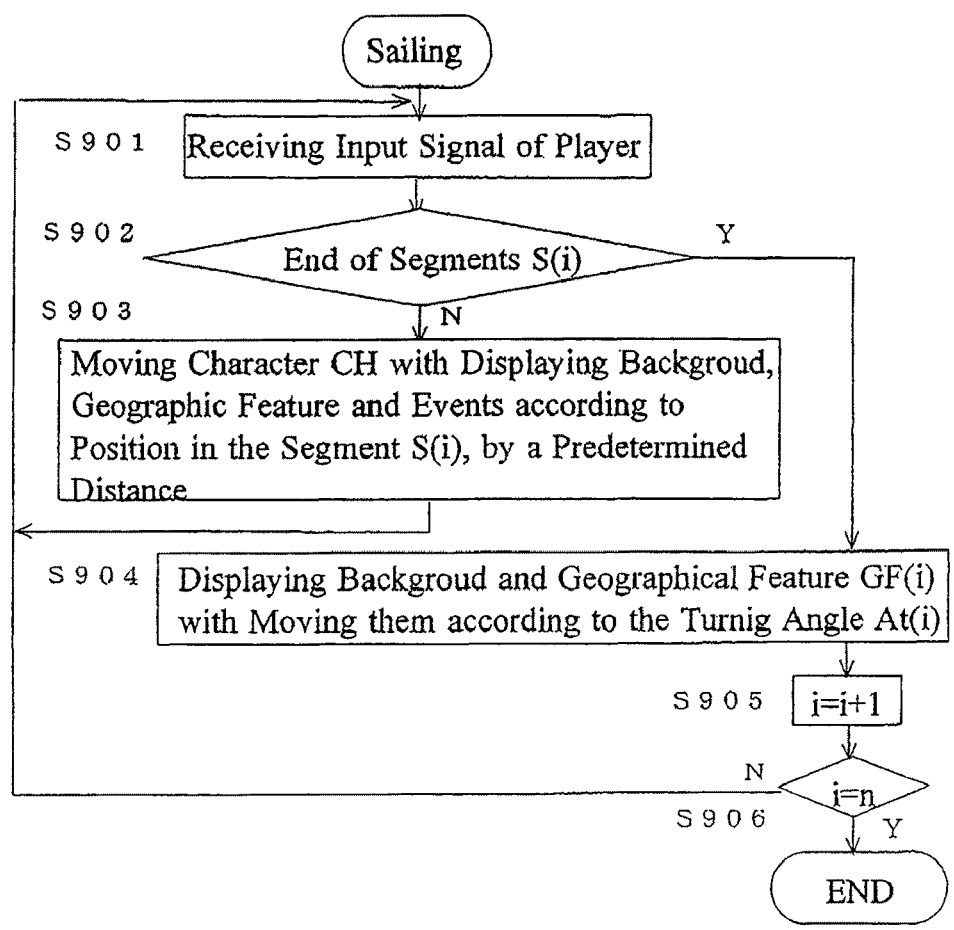
FIG. 13 is a flowchart of the sailing of an embodiment of a game control program according to the present invention.

FIG. 13 is a flowchart of the sailing (movement of the character CH) processing of the game control program according to the present invention. The sailing processing is executed by the following steps (character moving step).

Step S901: First, the input signal of the player for moving the character CH is received by the CPU 1000.

Step S902: Following to the step S901, it is judged whether the character reaches the end point of the segment S(i) or not. When the character reaches the end point, the processing is jumped to the step S904, otherwise, the processing is advanced to the step S903.

Step S903: The character CH is moved on the segment S(i) by a predetermined distance. During the movement, background, geographical feature and events are displayed.

Step S904: The game image at the juncture to the next segment is displayed. The background and geographical feature GF(i) are moved according to the turning angle At(i)

Step S905: Following to the step S904, the number "i" of the segment is increased by "1".

Step S906: Following to the step S905, it is judged whether the number "i" reaches the end "n" of the segment or not. When i=n, the processing is returned to the step S901, otherwise, the processing is terminated.

Therefore, a game field is changed in response to player's operation as well as to random factors.

What is claimed is:

1. A game control method executable on a game device formed with display means and control means including a touch panel, comprising:

providing the display means with a first image of a virtual game space, which shows a topographical map of the virtual game space;

allowing a player of the game to define a game stage course on the topographical map shown on the first image by drawing on the touch panel a course path between a game stage start point and a game stage end point;

detecting coordinates of the course drawn by the player on the topographical map of the virtual game space;

providing the display means with a second image of the virtual game space, which shows game scenes including generating a character, which moves in said virtual game space in response to manipulation by the player of the control means, and background scenery and geographical features, which appear along with the movement of the character;

dividing said course into segments, each segment having a plurality of potential positions for a character to move, each segment having stored in memory, and associated therewith, predetermined geographical features at and around the plurality of potential positions;

controlling the movement of the character so as to change a position of the character in said virtual game space substantially following the distribution of the segments one after the other;

setting the geographical features in said second image so as to appear one after the other along of the geographical position of each of said segments at which the character becomes positioned in said virtual game space;

preparing a plurality of events for a given segment;

setting one or more events from among the prepared plurality of events to be active for the given segment, wherein the set one or more events may affect the movement of the character and occur randomly in the game, scenes shown on the second image and around the geographical positions of the given segment, thereby to arrange the geographical features and the events appearing and occurring around the character moving substantially along the course designated by the player.

2. A game control method according to claim 1, further comprising:

setting a maximum turning angle;

calculating a geometrical turning angle of a subsequent segment relative to the preceding segment at each juncture between successive said segments across which the character moves;

judging whether said geometrical turning angle at the juncture across which the character is moving is more than said maximum turning angle or not; and limiting, at the juncture across which the character currently moves, the turning angle of the turning movement of the character to said maximum turning angle when said geometrical turning angle at the current juncture of the segments is more than said maximum turning angle.

3. A game control method according to claim 2, further comprising:

modifying the position of the segment of the course originally designated by the player to a position of said modified segment to which the character has moved when said geometrical turning angle is more than said maximum turning angle; and modifying positions of the segments subsequent to said modified segment to start from said position of said modified segment.

4. A method according to claim 1, wherein:

said set one or more events include different dangerous and normal events intended to elicit various respective emotional states of the player, and a frequency of a particular one of said different dangerous and normal events is determined according to an associated predetermined probability.

5. A game control method according to claim 1, further comprising:

judging whether the active event from a previous segment of the course traversed by the player is a dangerous event or a normal event;

when such judged event is dangerous, setting the active event for the next segment to be one among a set of normal events based on a random factor; and when such judged event is normal, setting a dangerous event probability for the active event of the next segment based on a number of immediately previous, consecutive normal events.

6. A game machine comprising:

a first display;

a second display provided separately from said first display; and control means operable by a player, wherein the game machine is configured to perform the method of:

providing the first display with a first image of a virtual game space, which shows a topographical map of the virtual game space;

allowing a player of the game to define a game stage course on the topographical map shown on the first image by drawing with the control means a course path between a game stage start point and a game stage end point;

detecting coordinates of the course drawn on the topographical map of the virtual game space in response to the player's operation;

indicating the course on the topographical map shown on the first display according to said detected coordinates;

providing the second display with a second image of the virtual game space, which shows game scenes including a character, which moves in said virtual game space in response to manipulation by the player on the control means, and background scenery and geographical features, which appear along with the movement of the character;

dividing said course into a plurality of segments, each segment having a plurality of potential positions for a character to move, each segment having stored in memory, and associated therewith, predetermined geographical features at and around the plurality of potential positions;

setting the geographical features on the background scenery shown on the second display so as to appear one after the other along the geographical position of each of said segments at which the character becomes positioned in said virtual game space;

preparing a plurality of events for a given segment;

setting one or more events from among the prepared plurality of events to be active for the given segment, wherein the set one or more events may affect the movement of the character, and occur randomly around the geographical position of said given segment, thereby to arrange the geographical features and the events appearing and occurring around the character moving means substantially along said segments of the course designated by the player.

7. A game machine according to claim 6, further configured to perform: setting a maximum turning angle;

calculating a geometrical turning angle of a subsequent segment relative to the preceding segment at each juncture between successive said segments across which the character moves;

judging whether said geometrical turning angle at the juncture across which the character is moving is more than said maximum turning angle or not, and limiting, at the juncture across which the character currently moves, the turning angle of the turning movement of the character to said maximum turning angle when said geometrical turning angle is more than said maximum turning angle.

8. A game machine according to claim 7, further configured to perform:

modifying the position of the segment of the course originally designated by the player to a position of a modified segment to which the character has moved when said geometrical turning angle is more than said maximum turning angle; and modifying positions of the segments subsequent to said modified segment to start from said position of said modified segment.

9. A game machine according to claim 6, wherein:

said events include different dangerous and normal events intended to elicit various respective emotional states of the player, and a frequency of a particular one of said different dangerous and normal events is determined according to an associated predetermined probability.

10. A non-transitory computer readable medium on which is stored program code executable by a processor for performing a method comprising:

providing a first image of a virtual game space, which shows a topographical map of the virtual game space on a game device display;

processing a sequence of player's inputs which trace a game stage course path between a start point and an end point and including a turning juncture allowing a player of the game to draw a course on the topographical map shown on the first image;

detecting coordinates of the course designated on the topographical map by the player;

providing a second image of the virtual game space, which shows game scenes including a character, which is configured to move in said virtual game space substantially along said course, and geographical features which appear along with the movement of the character;

dividing said course into segments, each segment having a plurality of potential positions for a character to move, each segment having stored in memory, and associated therewith, predetermined geographical features at and around the plurality of potential positions;

controlling the movement of the character so as to change a position of the character in said virtual game space substantially following the distribution of the segments one after the other;

setting the geographical features in said second image so as to appear one after the other along the geographical position of each of said segments at which the character becomes positioned in said virtual game space;

preparing a plurality of events for a given segment;

setting one or more events from among the prepared plurality of events to be active for the given segment, wherein the set one or more events may affect the movement of the character, and occur randomly in the games scenes shown on the second image around the geographical positions of said given segment, thereby to arrange the geographical features and the events appearing and occurring around said character moving substantially along the course designated by the player on the first image.

11. A non-transitory computer readable medium according to claim 10, wherein the method performed by the processor according to the program code further comprises:

setting a maximum turning angle;

calculating a geometrical turning angle of a subsequent segment relative to the preceding segment at each juncture between successive said segments across which the character moves;

judging whether said geometrical turning angle at the juncture across which the character is moving is more than the maximum turning angle or not; and limiting, at the juncture across which the character currently moves, the turning angle of the turning movement of the character to said maximum turning angle when said geometrical turning angle at the current juncture is more than said maximum turning angle.

12. A non-transitory computer readable medium according to claim 10, wherein the method performed by the processor according to the program code further comprises:

modifying the position of the segment of the course originally designated by the player to a position of a modified segment to which the character has moved when said geometrical turning angle is more than said maximum turning angle; and modifying positions of the segments subsequent to said modified segment to start from said position of said modified segment.

13. A non-transitory computer readable medium according to claim 10, wherein:

said events include different dangerous and normal events intended to elicit various respective emotional states of the player, and a frequency of a particular one of said different dangerous and normal events is determined according to an associated predetermined probability.

14. A game machine comprising, a first display formed with a touch panel;

a second display provided separately from said first display; and input devices including the touch panel and operable by a player;

wherein the game machine is configured to perform the method of:

providing the first display with a first image of a virtual game space, which shows a topographical map of the virtual game space;

processing a sequence of player's inputs to the touch panel which trace a course on the topographical map shown on the first image, a player's character moving along the course over a plurality of moves during a game;

indicating the course on the topographical map in said first image;

providing the second display with a second image of the virtual game space, which shows game scenes including a character, which moves in said virtual game space in response to manipulation by the player of the input devices, and geographical features which appear along with the movement of the character;

dividing said course into a plurality of segments, each segment having a plurality of potential positions for a character to move, each segment having stored in memory, and associated therewith, predetermined geographical features at and around the plurality of potential positions;

setting the geographical features in said game scene shown on the second image on the second display so as to appear one after the other around the geographical position of each of said segments at which the character becomes positioned in said virtual game space;

preparing a plurality of events for a given segment;

for the given segment selecting to be active, based at least in part on a random factor, an event from among the corresponding prepared plurality of events, while leaving inactive at least one remaining event of said of the corresponding prepared plurality of events;

setting a maximum turning angle;

calculating a geometrical turning angle of the next segment against the current segment at each juncture between successive said segments across which the character moves;

limiting the turning angle in the turning movement of the character to said maximal turning angle at the juncture across which the character becomes positioned if said geometrical turning angle at the current juncture is more than said maximal turning angle;

modifying the position of the segment of the course originally designated by the player to a position of a modified segment to which the character has moved when said geometrical turning angle is more than said maximum turning angle; and modifying positions of the segments subsequent to said position of said modified segment to start from said position of said modified segment, thereby to arrange the geographical features and the events appearing and occurring around the character moving substantially the course designated by the player.

15. A game machine according to claim 14, wherein:

said events include different dangerous and normal events intended to elicit various respective emotional states of the player, and a frequency of a particular one of said different dangerous and normal events is determined according to an associated predetermined probability.

* * * * *